United States Patent
Hu

(10) Patent No.: US 11,255,995 B2
(45) Date of Patent: Feb. 22, 2022

(54) METHODS AND SYSTEMS FOR DETERMINING SUBSURFACE FEATURE USING BROADBAND FULL WAVEFORM INVERSION

(71) Applicant: Advanced Geophysical Technology Inc., Houston, TX (US)

(72) Inventor: Wenyi Hu, Houston, TX (US)

(73) Assignee: Advanced Geophysical Technology Inc., Houston, TX (US)

( * ) Notice: Subject to any disclaimer, the term of this patent is extended or adjusted under 35 U.S.C. 154(b) by 0 days.

(21) Appl. No.: 17/211,087

(22) Filed: Mar. 24, 2021

(65) Prior Publication Data

US 2021/0302607 A1 Sep. 30, 2021

Related U.S. Application Data

(60) Provisional application No. 62/994,544, filed on Mar. 25, 2020.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/6222* (2013.01)

(58) Field of Classification Search
CPC . G01V 1/282; G01V 1/303; G01V 2210/6222
See application file for complete search history.

(56) References Cited

U.S. PATENT DOCUMENTS

| 10,578,755 | B2 * | 3/2020 | Wang | G01V 1/282 |
|---|---|---|---|---|
| 11,048,001 | B2 * | 6/2021 | Zhang | G01V 1/282 |
| 2018/0196154 | A1 * | 7/2018 | Gomes | G01V 1/303 |
| 2021/0199827 | A1 * | 7/2021 | Yoo | G01V 1/303 |

* cited by examiner

*Primary Examiner* — Elias Desta
(74) *Attorney, Agent, or Firm* — Finnegan, Henderson, Farabow, Garrett & Dunner, LLP

(57) ABSTRACT

A computer-implemented method for determining a subsurface feature, includes: determining a first velocity model based on an initial velocity model; generating a second velocity model based on measured seismic data at one or more first frequencies, the first velocity model, and a full waveform inversion (FWI); and in response to the second velocity model not satisfying a preset condition, performing a seismic forward simulation on the second velocity model to generate simulated seismic data at one or more second frequencies lower than the one or more first frequencies; updating the first velocity model based on the simulated seismic data at the one or more second frequencies; and updating the second velocity model based on the measured seismic data at the one or more first frequencies, the updated first velocity model, and the FWI, to determine the subsurface feature.

20 Claims, 12 Drawing Sheets

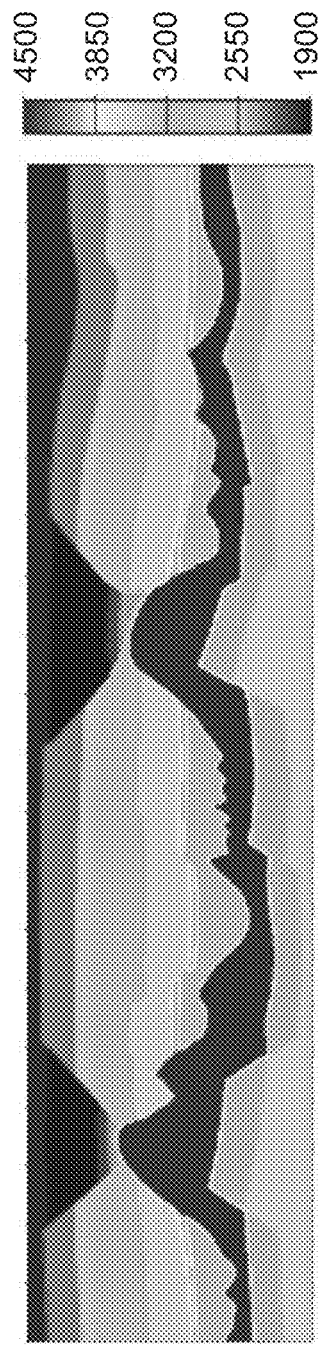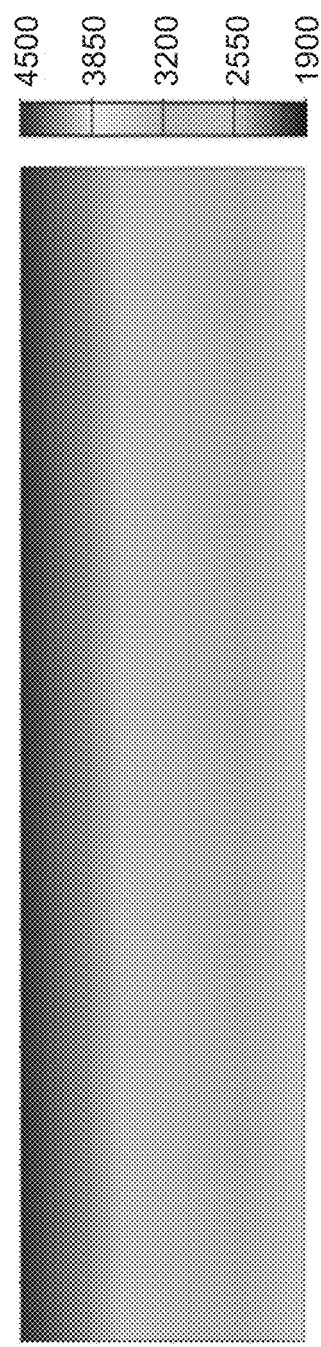
FIG. 5
FIG. 6

METHODS AND SYSTEMS FOR DETERMINING SUBSURFACE FEATURE USING BROADBAND FULL WAVEFORM INVERSION

CROSS REFERENCE

This application is based upon and claims priority to U.S. Provisional Application No. 62/994,544, filed on Mar. 25, 2020, the content of which is hereby incorporated by reference in its entirety.

TECHNICAL FIELD

The present disclosure generally relates to the technical field of seismic data analysis and, more particularly, to methods and systems for determining a subsurface feature using broadband full waveform inversion.

BACKGROUND

Seismic exploration involves detection of subsurface features based on seismic data. The seismic data may be obtained by generating, e.g., using vibrators or explosive detonations, seismic energy that may travel through a subsurface and recording, e.g., using an array of sensors or receivers, the reflections of that energy after it has traveled through the subsurface. The recorded seismic data may then be processed using data-processing techniques to determine subsurface features.

For example, the seismic data may include various types of information related to geological characteristics of subsurface geological structures. The subsurface geological structures may include different components (e.g., rocks, underground water, oils, salts, ores, sands, or the like) that may have different properties (e.g., elasticity, electric conductivity, Young's modulus, or the like), which may affect characteristics (e.g., velocities, magnitudes, phases, frequencies, or the like) of the seismic waves that pass through them. By analyzing the seismic data, the above described subsurface features may be determined. Seismic data analysis may be used for geological exploration, such as exploration of hydrocarbon materials (e.g., underground water, ores, or the like.

Full waveform inversion (FWI) is a seismic data processing method for subsurface velocity model budding. Through a data-fitting procedure based on a nonlinear optimization algorithm, the FWI may convert measured seismic data to a velocity model. The velocity model is a representation of velocities of seismic waves at respective locations in a subsurface when the seismic waves travelling through the subsurface. Due to a correspondence between the velocities of the seismic waves and subsurface features in the subsurface, the velocity model may be used to represent subface features in the subsurface.

However, due to hardware limitations of equipment, some critical information of the seismic data may be lost in seismic data measurement or collection. For example, information related to low-frequency components of seismic waves may be difficult to record. Such lost information may cause artifacts or errors in the velocity model. Sometimes, those artifacts may be difficult to identify and may lead to improper interpretation of the subsurface features.

SUMMARY

One aspect of the present disclosure is directed to a computer-implemented method for determining a subsurface feature. The method includes: determining a first velocity model based on an initial velocity model; generating a second velocity model based on measured seismic data at one or more first frequencies, the first velocity model, and a full waveform inversion (FWI); and, in response to the second velocity model not satisfying a preset condition, performing a seismic forward simulation on the second velocity model to generate simulated seismic data at one or more second frequencies lower than the one or more first frequencies; updating the first velocity model based on the simulated seismic data at the one or more second frequencies; and updating the second velocity model based on the measured seismic data at the one or more first frequencies, the updated first velocity model, and the FWI, to determine the subsurface feature.

Another aspect of the present disclosure is directed to a system. The system includes a processor and a memory storing instructions executable by the processor. The processor is configured to: determine a first velocity model based on an initial velocity model; generate a second velocity model based on measured seismic data at one or more first frequencies, the first velocity model, and a full waveform inversion (FWI); and, in response to the second velocity model not satisfying a preset condition, perform a seismic forward simulation on the second velocity model to generate simulated seismic data at one or more second frequencies lower than the one or more first frequencies; update the first velocity model based on the simulated seismic data at the one or more second frequencies; and update the second velocity model based on the measured seismic data at the one or more first frequencies, the updated first velocity model, and the FWI, to determine the subsurface feature.

Yet another aspect of the present disclosure is directed to a non-transitory computer-readable storage medium. The non-transitory computer-readable storage medium may store therein instructions that, when executed by a processor of a device, cause the device to perform operations. The operations include: determining a first velocity model based on an initial velocity model; generating a second velocity model based on measured seismic data at one or more first frequencies, the first velocity model, and a full waveform inversion (FWI); and, in response to the second velocity model not satisfying a preset condition, performing a seismic forward simulation on the second velocity model to generate simulated seismic data at one or more second frequencies lower than the one or more first frequencies; updating the first velocity model based on the simulated seismic data at the one or more second frequencies; and updating the second velocity model based on the measured seismic data at the one or more first frequencies, the updated first velocity model, and the FWI, to determine the subsurface feature.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIGS. 5 and 6 are graphical representations showing a true velocity model and an initial velocity model; respectively, consistent with some embodiments of this disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of methods and devices consistent with aspects of the disclosure as recited in the appended claims.

Exemplary embodiments of the disclosure provide technical solutions for restoring missing low-frequency seismic data in measured seismic data, using broadband full waveform inversion (FWI) through alternating restoration and inversion, for determining a subsurface feature. The technical solutions provided herein may be referred to as alternating restoration and inversion FWI ("ARI-FWI"). The ARI-FWI may alternatingly perform data inversion, bridging, and data restoration in an iterative manner to progressively restore and correct low wavenumber information in a reconstructed velocity model. The ARI-FWI may also retrieve progressively restored and corrected low resolution structural information that is buried in overwhelming high wavenumber components of the reconstructed velocity model. The ARI-FWI may further convert the reconstructed velocity model to a data domain, by which the missing low-frequency seismic data in the measured seismic data may be restored with high accuracy.

Figure 1:
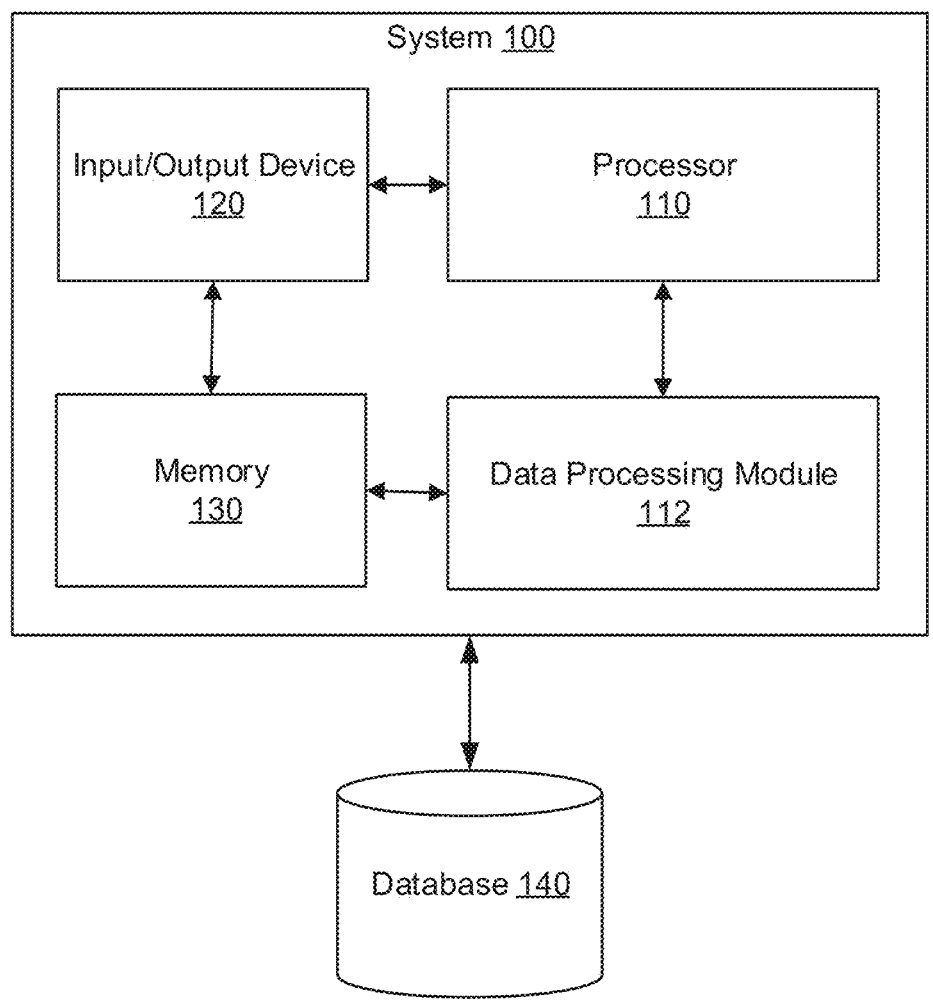
FIG. 1 is a block diagram of a system for determining a subsurface feature, consistent with some embodiments of this disclosure.

FIG. 1 is a block diagram of a system 100 for determining a subsurface feature based on reconstructed low-frequency seismic data, consistent with some embodiments of this disclosure. System 100 may be one or more computing devices configured to execute software instructions stored in memory to perform one or more processes or methods described below. For example, system 100 may include one or more memory devices for storing data and software instructions and one or more hardware processors to analyze the data and execute the software instructions to perform seismic data analysis functions and operations.

In FIG. 1, system 100 includes a hardware processor 110, an input/output (I/O) device 120, and a memory 130. It should be noted that system 100 may include any number of those components and may further include any number of any other components. System 100 may be standalone, or it may be part of a subsystem, which may be part of a larger system. For example, system 100 may represent distributed servers that are remotely located and communicate over a network. In another example, system 100 may represent a standalone computer that is locally located.

Processor 110 may include or one or more known processing devices, such as, for example, a microprocessor. In some embodiments, processor 110 may include any type of single or multi-core processor, mobile device microcontroller, central processing unit, etc. In operation, processor 110 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 130, processor 110, or elsewhere.

I/O device 120 may be one or more devices configured to allow data to be received and/or transmitted by system 100, I/O device 120 may include one or more user I/O devices and/or components, such as those associated with a keyboard, mouse, touchscreen, display, etc. I/O device 120 may also include one or more digital and/or analog communication devices that allow system 100 to communicate with other machines and devices, such as other components of system 100, I/O device 120 may also include interface hardware configured to receive input information and/or display or otherwise provide output information. For example, I/O device 120 may include a monitor configured to display a customer interface.

Memory 130 may include one or more storage devices configured to store instructions used by processor 110 to perform functions related to disclosed embodiments. For example, memory 130 may be configured with one or more software instructions associated with programs and/or data.

Memory 130 may include a single program that performs the functions of the system 100, or multiple programs. Additionally, processor 110 may execute one or more programs located remotely from system 100. Memory 130 may also store data that may reflect any type of information in any format that the system may use to perform operations consistent with disclosed embodiments. Memory 130 may be a volatile or non-volatile (e.g., ROM, RAM, PROM, EPROM, EEPROM, flash memory, etc.), magnetic, semiconductor, tape, optical, removable, non-removable, or another type of storage device or tangible (i.e., non-transitory) computer-readable medium.

Consistent with some embodiments in this disclosure, system 100 includes a data processing module 112 configured to receive and process seismic data. Data processing module 112 may be implemented as software (e.g., program codes stored in memory 130), hardware (e.g., a specialized chip incorporated in or in communication with processor 110), or a combination of both. In some embodiments, data processing module 112 may perform the ARI-FWI noted above and further described below.

System 100 may also be communicatively connected to a database 140. Database 140 may be a database implemented in a computer system (e.g., a database computer) that may be integrated in system 100 or be separated and in communication with system 100. Database 140 may include one or more memory devices that store information and are accessed and/or managed through system 100. By way of example, database 140 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 100 may include database 140. Alternatively, database 140 may be located remotely from the system 100. Database 140 may include computing components (e.g., database management system, database server, etc.) configured to receive and process requests for data stored in memory devices of database 140 and to provide data from database 140.

In exemplary embodiments, system 100 may process seismic data based on a full waveform inversion (FWI) process. The FWI process may perform data fitting based on a nonlinear optimization algorithm, such that subsurface features, e.g., a geological structure, may be determined when a difference between simulated seismic data (simulation data) and measured seismic data (measurement data) reaches a minimum. For example, a cost function of an FWI process in the frequency domain y be represented as Eq. (1):

$$c(v) = \sum_{f=1}^{N_f} \sum_{s=1}^{N_s} \sum_{r=1}^{N_r} \|S_{r,s,f}(v) - M_{r,s,f}\|^2 \quad \text{Eq. (1)}$$

where S represents simulation data of a velocity model, M represents measurement data, and v represents velocities of subsurface seismic waves to be reconstructed. The subscripts f, s, and r represent indices of frequency, source, and receiver of the subsurface seismic waves, respectively. $N_s$, $N_r$, and $N_f$ represent numbers of sources, receivers, and frequencies of the subsurface seismic waves, respectively. c(v) represents a cost function value, which indicates a level of truthfulness of the velocity model. In some embodiments, $S_{r,s,f}(v)$ may have different levels of nonlinearity at different frequencies of the subsurface seismic waves. Typically, the higher the frequency of the subsurface seismic waves, the higher level of nonlinearity of $S_{r,s,f}(v)$ may be. In such cases $S_{r,s,f}(v)$ may be referred to as having different levels of nonlinearity in its frequency domain.

In exemplary embodiments, to minimize c(v), a gradient of c(v) with respect to v may be determined, and the velocity model v may be updated in accordance with the gradient. For example, by performing a back-propagation procedure (e.g., a residual back-propagation procedure), the velocity model v may be updated such that the data discrepancy (e.g., $\|S_{r,s,f}(v) - M_{r,s,f}\|$) may be reduced. In some embodiments, the residual back-propagation procedure may be performed iteratively until the data discrepancy is within a predefined error tolerance. Until then, the FWI process may output the latest velocity model that represents the sought subsurface features.

In some embodiments, due to the nonlinear nature of the FWI, the minimization of the cost function in Eq. (1) may be unsuccessful when only measured seismic data, from which low-frequency seismic data may be absent, is used as an input to the FWI process. For example, the cost function value c(v) may become stagnant at a local minimum if the FWI process is initiated using $M_{r,s,f}$ at relatively high frequencies, or if the initial $S_{r,s,f}(v)$ is not sufficiently close to the true velocity model. In such cases, the local minimum of c(v) may remain outside the error tolerance, and the FWI process may generate velocities of the subsurface seismic waves having artifacts, referred to as a "cycle-skipping phenomenon."

Figure 2:
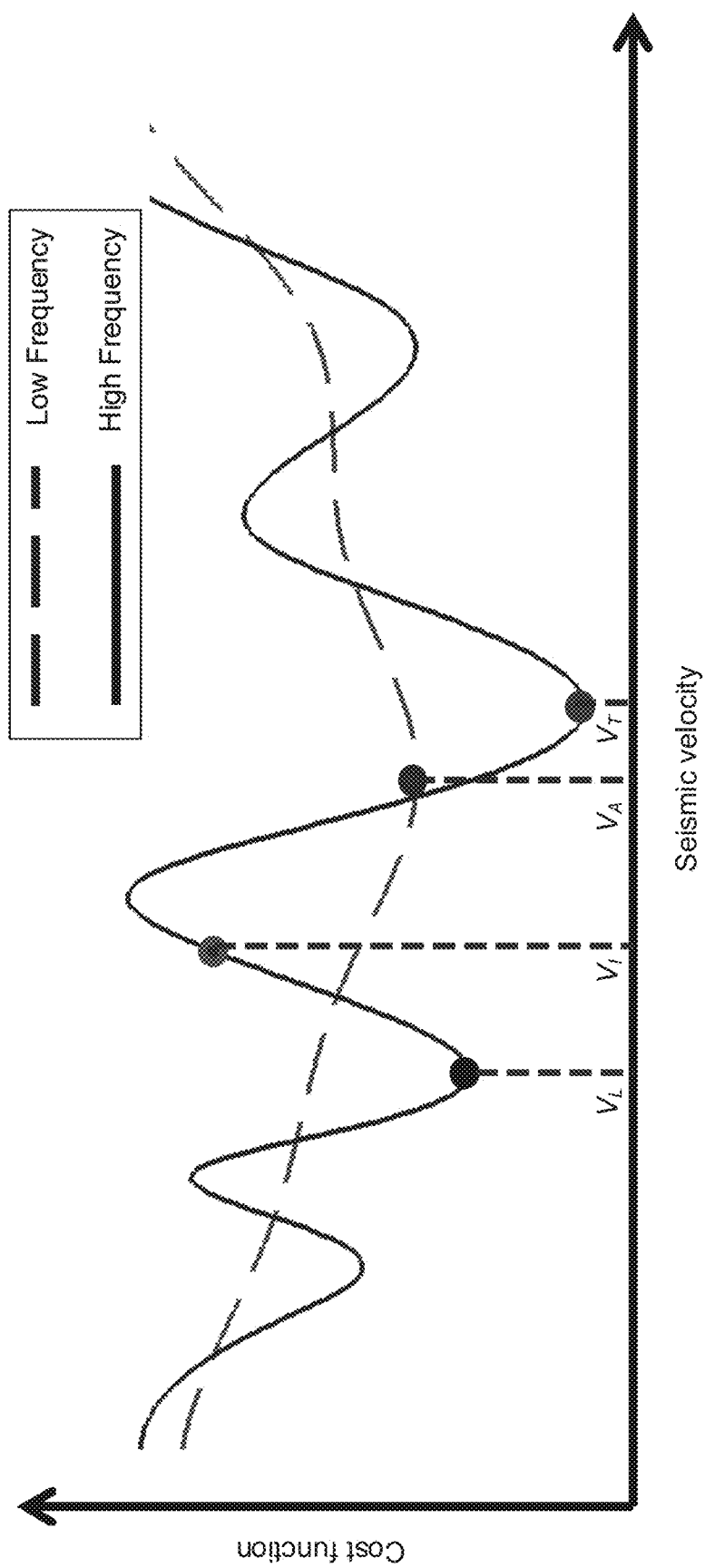
FIG. 2 is a graphical representation showing an example cycle-skipping phenomenon in an FWI process of seismic data, consistent with some embodiments of this disclosure.

By way of example, FIG. 2 is a graphical representation showing an example cycle-skipping phenomenon in the FWI process, according to an exemplary embodiment. In FIG. 2, the x-axis represents velocities (e.g., v in Eq. (1)) of subsurface seismic waves, and the y-axis represents cost function values (e.g., c(v) in Eq. (1)) of the FWI process. The dashed curve represents a cost function in a low-frequency domain (e.g., not exceeding 10 Hz), and the solid curve represents a cost function in a high-frequency domain (e.g., exceeding 10 Hz).

For the cost function in the high-frequency domain (i.e., the solid curve), $V_I$ represents an initial velocity where the FWI process initializes a velocity model reconstruction (e.g., $S_{r,s,f}(v)$ in Eq. (1)). Typically, the cost function value (e.g., c(v) in Eq. (1)) corresponding to the initial velocity model is not at a minimum (e.g., a basin or valley of the solid curve). The goal of the FWI process is to converge the cost function value to a global minimum at $V_T$ in FIG. 2. However, if $V_I$ is not near $V_T$, the process may converge the cost function value to a local minimum at $V_L$ instead of the global minimum, due to the relatively high nonlinearity of the cost function in the high-frequency domain. Such a local-minimum convergence may cause the cycle-skipping phenomenon in the FWI process, and lead to inaccurate or unsuccessful minimization of the cost function.

For the cost function in the low-frequency domain (i.e., the dashed curve), $V_A$ represents a global minimum of the cost values in the low-frequency domain. Compared with the cost function in the high-frequency domain (i.e., the solid curve), the cost function in the low-frequency domain generally has a lower level of nonlinearity (e.g., relatively smooth in FIG. 2), which may translate to a higher likelihood of finding a global minimum of the cost values in the low-frequency domain, thereby avoiding the cycle-skipping phenomenon.

Accordingly, in exemplary embodiments, low-frequency seismic data may first be estimated from measured high-frequency seismic data. Typically, in exploration geophysics, measured seismic data are non-random earth response signals to a wideband excitation deployed on the earth surface. Such non-randomness of the measured seismic data includes an implicit relationship between low-frequency components of the measured data and high-frequency components of the measured data. Such a relationship may be established through the wavenumber components of the subsurface geological and geophysical properties.

Figure 3:
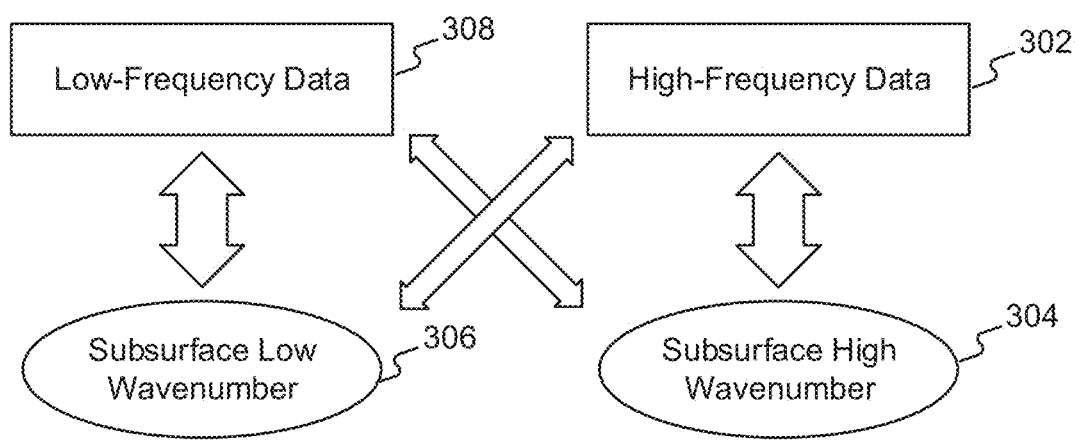
FIG. 3 is a schematic diagram showing a relationship between seismic data and wavenumber components of subsurface structures, consistent with some embodiments of this disclosure.

By way of example, FIG. 3 is a schematic diagram showing a relationship between seismic data and wavenumber components of subsurface structures, consistent with an exemplary embodiment. For example, as illustrated in FIG. 3, high-frequency data 302 may be mainly contributed from subsurface high wavenumber 304 (represented by a wide arrow therebetween), and weakly contributed from subsurface low wavenumber 306 (represented by a narrow arrow therebetween). Also, for example, low-frequency data 308 may be mainly contributed from the subsurface low wavenumber 306 (represented by a wide arrow therebetween) and weakly contributed from subsurface high wavenumber 304 (represented by a narrow arrow therebetween).

As illustrated in FIG. 3, a route may be established to derive low-frequency data 308 from high-frequency data 302 through at least one of subsurface low wavenumber 306 or subsurface high wavenumber 304. For example, low-frequency data 308 may be predicted (e.g., via FWI) from high-frequency data 302 by retrieving information from subsurface low wavenumber 306. In some embodiments, to improve performance of the FWI, proper reconstructed information of subsurface low wavenumber 306 may be amplified, incorrect reconstructed information of subsurface low wavenumber 306 may be removed, and subsurface high wavenumber 304 may be suppressed during the restoration of low-frequency data 308.

In some embodiments, a beat tone method, also referred to as a pseudo-low-frequency method, may be used to estimate low-frequency seismic data from measured high-frequency seismic data. A description of the beat tone method is provided in Hu, W., 2014. FWI without low frequency data—Beat Tone inversion: 84th Annual International Meeting, SEG, Expanded Abstracts, 1116-1120, which is herein incorporated by reference in its entirety. In some embodiments, a bandwidth-extension method may be used to estimate the low-frequency seismic data from measured high-frequency seismic data. It should be noted that the present disclosure is not limited to the beat tone method or the bandwidth-extension method, and any method that can estimate low-frequency seismic data from measured high-frequency seismic data may be used.

In exemplary embodiments, the beat tone method may determine beat tone data according to Eq. (2) as follows;

$$\Phi_{BT}(S_2, S_1) = \Phi(S_2) - \Phi(S_1), \quad \text{Eq. (2)}$$

where $S_1$ and $S_2$ represent frequency domain data corresponding to frequencies $f_1$ and $f_2$, respectively, $\Phi$ represents a phase function, and $\Phi_{BT}$ is the determined beat tone phase data. For example, $S_1$ may be $S_1=\cos(2\pi f_1 t)$, and $S_2$ may be $S_2=\cos(2\pi f_2 t)$. Also, for example, $|f_1-f_2|<<f_1, f_2$.

Figure 4:
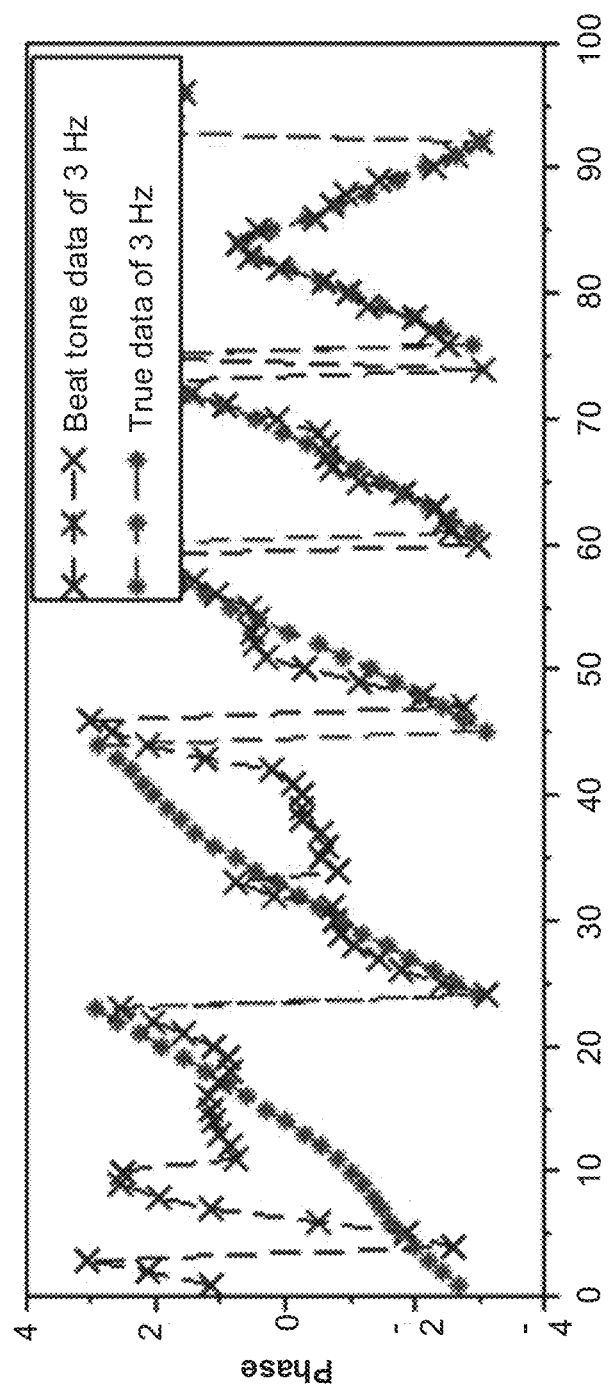
FIG. 4 is a graphical representation of comparison between beat tone data and true low-frequency data, consistent with some embodiments of this disclosure.

FIG. 4 is a graphical representation of comparison between the phase information of beat tone data and corresponding low-frequency data, consistent with some embodiments of this disclosure. In FIG. 4, the star-dash line represents true 3-Hz low-frequency data in an experiment, and the cross-dash line represents beat tone data derived (e.g., in accordance with Eq. (2)) from 10-Hz high-frequency data and 13-Hz high-frequency data. As shown in FIG. 4, the beat tone data is an approximation to the true low-frequency data.

As noted above, embodiments of the disclosure provide methods and systems for restoring missing low-frequency seismic data in measured seismic data using the ARI-FWI, for determining a subsurface feature. In exemplary embodiments, a computer system (e.g., system 100 in FIG. 1) may be used for implementing the ARI-FWI process. For example, computer instructions stored in a non-transitory medium (e.g., memory 130 or data processing module 112 in FIG. 1) may be executed by a processor (e.g., processor 110 in FIG. 1) to perform the ARI-FWI process. For ease of discussion, some examples are described below with reference to methods, systems, devices, and/or non-transitory computer-readable media, with the understanding that discussions of each apply equally to the others. For example, some aspects of methods may be implemented by a computing device or software running thereon. Other aspects of such methods may be implemented over a network (e.g., a wired network, a wireless network, or both).

In exemplary embodiments, the ARI-FWI process is an iterative process, including repeating operations performed in one or more iterations. For example, the ARI-FWI process may initiate by performing an FWI on a set of estimated low-frequency data to generate a low-resolution velocity model. After that, in every iteration of the ARI-FWI process, the FWI may be applied (e.g., with the low-resolution velocity model as an input) to measured seismic data to produce a high-resolution velocity model. This high-resolution velocity model may be input into a forward seismic modeling simulator to generate simulated seismic data including reconstructed low-frequency components. The FWI may then be applied on the simulated seismic data to update the low-resolution velocity model to be used for a next ARI-FWI iteration. By doing so, the ARI-FWI process may perform the low-frequency data restoration and inversion alternatingly in an iterative manner, in which additional information may be continuously generated and contributed into the ARI-FWI process, thus the data restoration accuracy may be increased as the iteration proceeds.

In exemplary embodiments, the ARI-FWI process may include determining a first velocity model based on an initial velocity model. By way of example, FIG. 5 is a graphical representation showing a true velocity model and FIG. 6 is a graphical representation showing an initial velocity model, consistent with some embodiments of this disclosure. The true velocity model illustrated in FIG. 5 may represent true subsurface features, such as subsurface geological structures and geophysical properties. The initial velocity model illustrated in FIG. 6 is different from the true velocity model of FIG. 5 and may be used for determining the first velocity model.

In some embodiments, the ARI-FWI process may generate the initial velocity model using, e.g., a conventional velocity model building method such as a travel-time tomography technique, a stacking velocity technique, a wave equation tomography, a technique of velocity estimation from well log data, etc. In some embodiments, the ARI-FWI may obtain the initial velocity model by generating the initial velocity model based on a priori knowledge of the subsurface feature. The priori knowledge may be about the subsurface geological and/or geophysical environments and properties, and may be different from the true velocity model (thus subsurface features) to be reconstructed, and may be similar to the true velocity model to be reconstructed if possible. In some embodiments, the ARI-FWI may obtain the initial velocity model based on a seismic data processor's experience and knowledge. For example, the seismic data processor may be a processor configured to process seismic data, and may be a different processor than, or the same processor as, the processor performing the ARI-FWI process.

In some embodiments, to determine the first velocity model, the ARI-FWI process may include estimating low-frequency seismic data based on measured high-frequency seismic data, and generating the first velocity model based on the estimated seismic data, the initial velocity model, and a full waveform inversion (FWI). For example, the FWI may use the estimated seismic data and the initial velocity model as inputs to generate the first velocity model.

The measured high-frequency seismic data may be at one or more first frequencies, such as frequencies higher than a threshold frequency (e.g., 8 Hz, 10 Hz, 15 Hz, 30 Hz, or any frequency), and the low-frequency seismic data may be at one or more second frequencies lower than the threshold frequency. In some embodiments, the frequency threshold may be a predetermined frequency. In some embodiments, the frequency threshold may be determined based on measured seismic data. For example, if frequency components lower than a certain frequency lack in the measured seismic data, that certain frequency may be determined as the frequency threshold.

In an embodiment, to estimate the low-frequency seismic data, the ARI-FWI process may include determining beat tone data from the measured seismic data at the one or more first frequencies. In another example, the ARI-FWI process may include estimating the low-frequency seismic data at the one or more second frequencies lower than the one or more first frequencies using a bandwidth-extension technique. It should be noted that the seismic data at the one or more second frequencies may be estimated using any other techniques and is not limited to the example embodiments described herein.

In some embodiments, the ARI-FWI process may include determining the initial velocity model as the first velocity model, for generating the second velocity model described below.

In exemplary embodiments, the ARI-FWI process may include generating a second velocity model based on the measured seismic data at the one or more first frequencies (e.g., frequencies higher than 10 Hz), the first velocity model, and the FWI. For example, the FWI may use the measured seismic data and the first velocity model as inputs to generate the second velocity model. In some embodiments, a resolution of the first velocity model may be lower than a resolution of the second velocity model. In some embodiments, the measured seismic data may be represented in one of a time domain or a frequency domain. In some embodiments, the measured seismic data is in a time domain. Accordingly, the ARI-FWI process may include converting the measured seismic data from the time domain to a frequency domain and performing the FWI using an FWI engine in the frequency domain. Alternatively, the ARI-FWI process may perform the FWI on the measured seismic data in the time domain using an FWI engine in the time domain. In some embodiments, the measured seismic data is in a frequency domain, and the ARI-FWI process may perform the FWI on the measured seismic data in the frequency domain.

In exemplary embodiments, in response to the second velocity model not satisfying a preset condition, the ARI-FWI process may include performing a seismic forward simulation on the second velocity model to generate simulated seismic data at the one or more second frequencies (e.g., frequencies lower than 10 Hz) lower than the one or more first frequencies (e.g., frequencies higher than 10 Hz). The simulated seismic data may include low-frequency components and high-frequency components. The preset condition may be that the second velocity model generated in a current iteration converges, e.g., having a difference smaller than a preset threshold, compared with the second velocity model generated in a previous iteration. The preset condition may also be that the low-frequency components of the simulated data generated in the current iteration converges, e.g., having a difference smaller than a preset threshold, compared with the low-frequency components of the simulated data generated in a previous iteration.

In some embodiments, to generate the simulated seismic data, the seismic forward simulation may use a finite-difference time-domain (FDTD) method, a finite element method (FEM), a boundary element method, an integral equation method, a spectral element method, a pseudo spectral method, a fast multipole method, a method of lines, a finite volume method, a meshfree method, or a discontinuous Galerkin method, or any other computational method. An excitation source used in the seismic forward simulation may be based on an actual excitation source that is used to generate the measured seismic data, and may be a narrow-band source, a wide-band source, a harmonic source, or any source with an arbitrary frequency spectrum. By way of example, the seismic forward simulation may be implemented as program codes stored in memory 130 or data processing module 112 of FIG. 1.

In exemplary embodiments, in response to the second velocity model not satisfying the preset condition, the ARI-FWI process may further include updating the first velocity model based on the simulated seismic data at the one or more second frequencies, and updating the second velocity model based on the measured seismic data at the one or more first frequencies, the updated first velocity model, and the FWI, to repeat the ARI-FWI process in a next iteration.

In exemplary embodiments, in response to the second velocity model satisfying the preset condition, e.g., the second velocity model generated at the current iteration converging, the ARI-FWI process may further include outputting the second velocity model representing the subsurface feature.

In exemplary embodiments, the preset condition may be a first preset condition, and the ARI-FWI process may further include performing the updating the first velocity model based on the simulated seismic data at the one or more second frequencies in response to the simulated seismic data at the one or more second frequencies not satisfying a second preset condition. In response to the simulated seismic data at the one or more second frequencies satisfying the second preset condition, the ARI-FWI process may further include outputting at least one of the simulated seismic data at the one or more second frequencies, or the second velocity model representing the subsurface feature. For example, the second preset condition may be that the simulated seismic data generated in a current iteration converges, e.g., having a difference smaller than a preset threshold compared with the simulated seismic data generated in a previous iteration.

Figure 7:
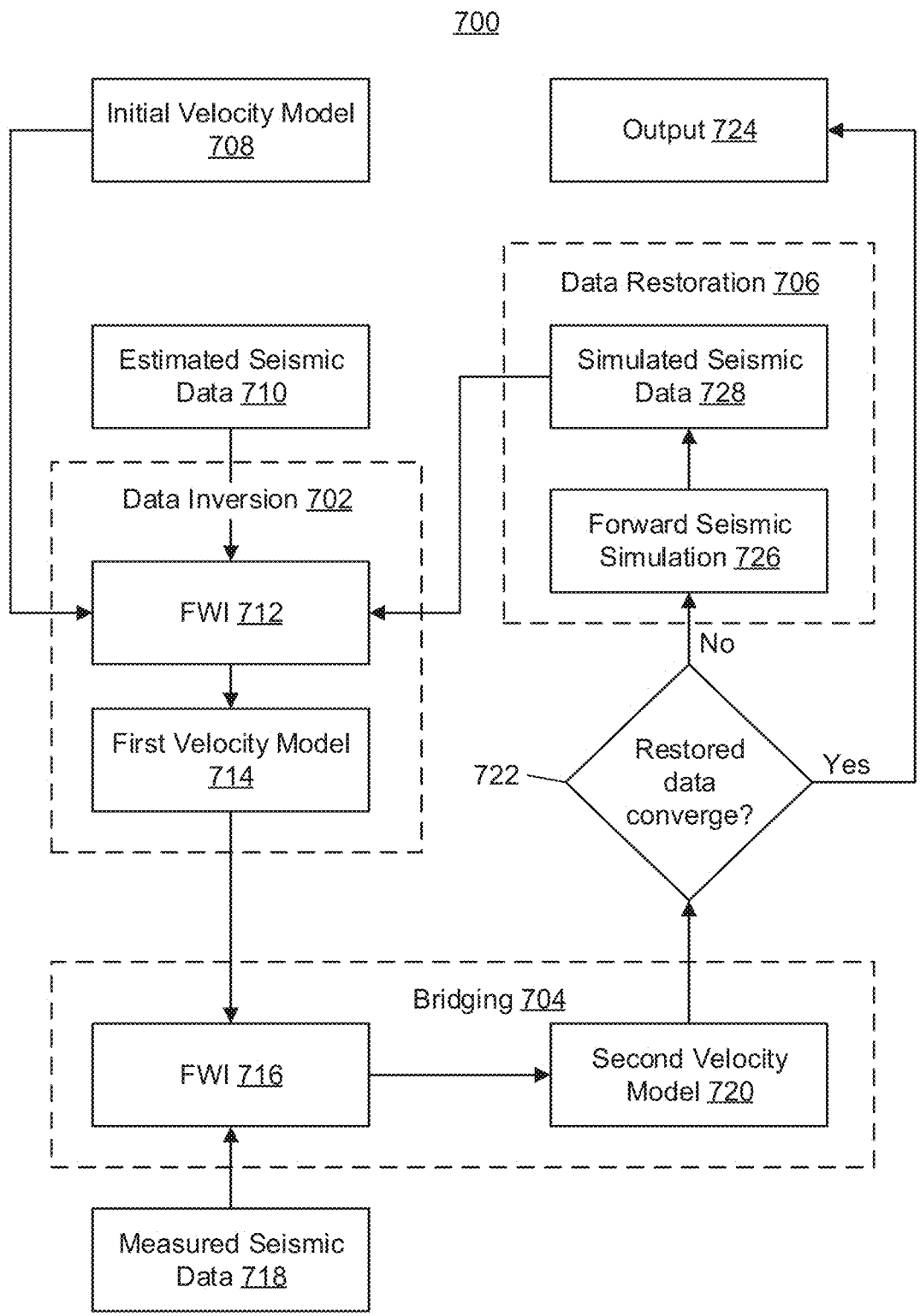
FIG. 7 is a flowchart of an example alternating restoration and inversion FWI (ARI-FWI) process, consistent with some embodiments of this disclosure.

By way of example, FIG. 7 is a flowchart of an example ARI-FWI process 700, consistent with some embodiments of this disclosure. As illustrated in FIG. 7, process 700 includes: an operation module 702 for data inversion, an operation module 704 for bridging, and an operation module 706 for data restoration, represented by the three dash-line boxes in FIG. 7. An "operation module," as used herein, may refer to one or more grouped operations. Process 700 may also include more or less operations than the operation modules 702, 704, and 706.

In operation module 702 for data inversion, an initial velocity model 708 and estimated seismic data 710 may be inputted into an FWI 712 (e.g., an FWI operating on low-frequency data) to generate a first velocity model 714 (e.g., a low-resolution velocity model). First velocity model 714 may include partially recovered information of low wavenumbers (e.g., subsurface low wavenumber 306 illustrated and described in association with FIG. 3). In some embodiments, estimated seismic data 710 may be generated at one or more second frequencies lower than measured seismic data 718 that are at one or more first frequencies. For example, estimated seismic data 710 may be determined from measured seismic data 718 using beat tone data.

Operation module 704 for bridging may connect operation module 702 for data inversion and operation module 706 for data restoration. In operation module 704, first velocity model 714 and measured seismic data 718 (e.g., high-frequency seismic data) may be inputted into an FWI 716 (e.g., an FWI operating on high-frequency data) to generate a second velocity model 720 (e.g., a high-resolution velocity model).

Between operation module 704 and operation module 706, it may be determined at operation 722 whether restored data converges. For example, the restored data may be the second velocity model 720 or reconstructed low-frequency seismic data in a current iteration. It may be determined whether the restored data generated in the current iteration of process 700 has a difference below a threshold value compared with the restored data generated in a previous iteration of process 700. If the restored data converges, process 700 may terminate at operation 724 to output at least one of second velocity model 720 or the reconstructed low-frequency data for determining a subsurface feature corresponding to measured seismic data 718.

If the restored data does not converge, e.g., due to cycle-skipping-induced artifacts, process 700 may proceed to operation module 706 for data restoration, in which second velocity model 720 may be used as input to perform a forward seismic simulation 726 to generate simulated seismic data 728. Simulated seismic data 728 may include reconstructed low-frequency seismic data that is missing in measured seismic data 718. In some embodiments, the reconstructed low-frequency seismic data in a current iteration of process 700 may be used as the restored data at operation 722 in a next iteration of process 700.

After being generated, the reconstructed low-frequency seismic data in simulated seismic data 728 may be inputted back to FWI 712 to start a new iteration of process 700. For example, in the new iteration, FWI 712 may use initial velocity model 708 and simulated seismic data 728 (instead of estimated seismic data 710) as inputs, to update first velocity model 714. By doing so, process 700 may enhance the accuracy of the low-wavenumber components in the first velocity model 714 in the new iteration, and forward seismic simulation 726 in the new iteration may generate simulated seismic data 728 with improved accuracy.

As illustrated in FIG. 7, operation modules 702, 704, and 706 may be implemented alternatingly to restore low-frequency components missing in measured seismic data 718. In some embodiments, measured seismic data 718 may be represented in one of a time domain or a frequency domain, and FWI 712 as well as FWI 716 may operate in one of the time domain or the frequency domain, respectively. Eventually, the restored low-frequency components may converge to true low-frequency data, and the restored data outputted at operation 724 may include correct broad and continuous bandwidth wavenumber components, thus eliminating the cycle-skipping artifacts.

Figure 8:
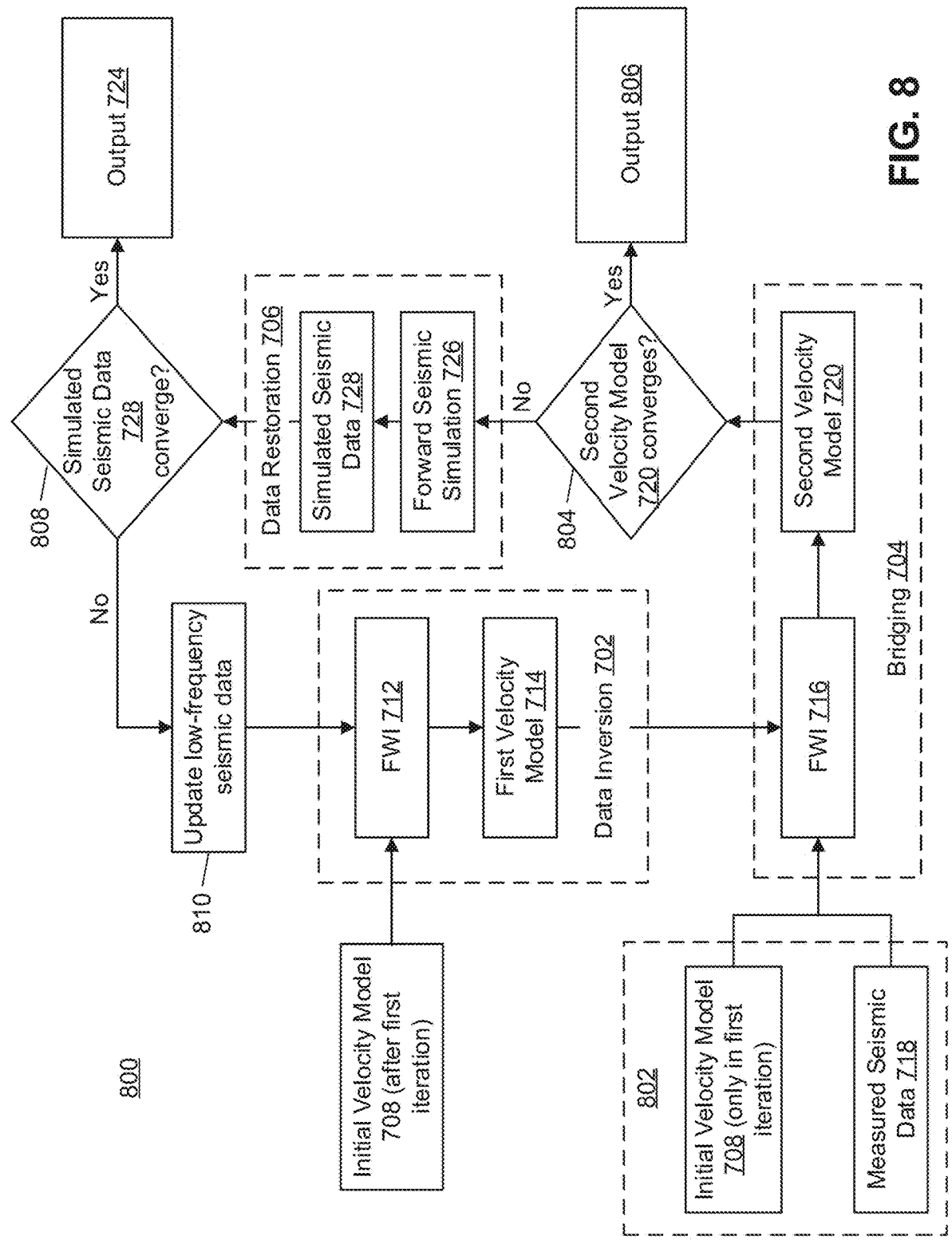
FIG. 8 is a flowchart of another example ARI-FWI process, consistent with some embodiments of this disclosure.

By way of example, FIG. 8 is a flowchart of another example ARI-FWI process 800, consistent with some embodiments of this disclosure. Process 800 share the same operation module 702 (including FWI 712 and first velocity model 714), operation module 704 (including FWI 716, second velocity model 720), operation module 706 (including forward seismic simulation 726 and simulated seismic data 728), initial velocity model 708, measured seismic data 718, and operation 724 with process 700 in FIG. 7, which will not be repeatedly described in detail here.

As illustrated in FIG. 8, process 800 does not use estimated seismic data (e.g., estimated seismic data 710 in FIG. 7) and may start at operation 802 (represented as a dash-line box enclosing initial velocity model 708 and measured seismic data 718) in the first operation of process 800. At operation 802, initial velocity model 708 and measured seismic data 718 may be inputted to FWI 716 to generate second velocity model 720. In some embodiments, measured seismic data 718 of process 800 may be represented in one of a time domain or a frequency domain, and FWI 712 as well as FWI 716 may operate in one of the time domain or the frequency domain, respectively. For example, if FWI 712 and FWI 716 operate in the frequency domain and measured seismic data 718 is in the time domain, measured seismic data 718 can be converted to the frequency domain.

At operation 804, it may be determined whether second velocity model 720 converges. For example, it may be determined whether second velocity model 720 generated in a current iteration of process 800 has a difference below a threshold value compared with second velocity model 720 generated in a previous iteration of process 800. If second velocity model 720 converges, process 800 may terminate at operation 806 to output second velocity model 720 for determining a subsurface feature corresponding to measured seismic data 718. In the first iteration of process 800, operation 804 may be skipped and process 800 may directly proceed to operation module 706.

If second velocity model 720 does not converge at operation 804, process 800 may proceed to operation module 706, in which second velocity model 720 may be used as input to perform forward seismic simulation 726 to generate simulated seismic data 728, which includes reconstructed low-frequency seismic data that is missing in measured seismic data 718. At operation 808, it may be determined whether the reconstructed low-frequency seismic data converges. For example, it may be determined whether the reconstructed low-frequency seismic data generated in a current iteration of process 800 has a difference below a threshold value compared with the reconstructed low-frequency seismic data generated in a previous iteration of process 800. If the reconstructed low-frequency seismic data converges, process 800 may terminate at operation 724 to output at least one of second velocity model 720 or the reconstructed low-frequency seismic data for determining the subsurface feature.

If the reconstructed low-frequency seismic data does not converge at operation 808, process 800 may proceed to operation 810, in which the reconstructed low-frequency seismic data may be used to update low-frequency seismic data. After operation 810, process 800 may proceed to operation module 702 in a new iteration, in which the updated low-frequency seismic data and initial velocity model 708 may be inputted to FWI 712, to update first velocity model 714. Process 800 can repeat the above-described iterations until terminating at either operation 724 or 806.

Figure 9:
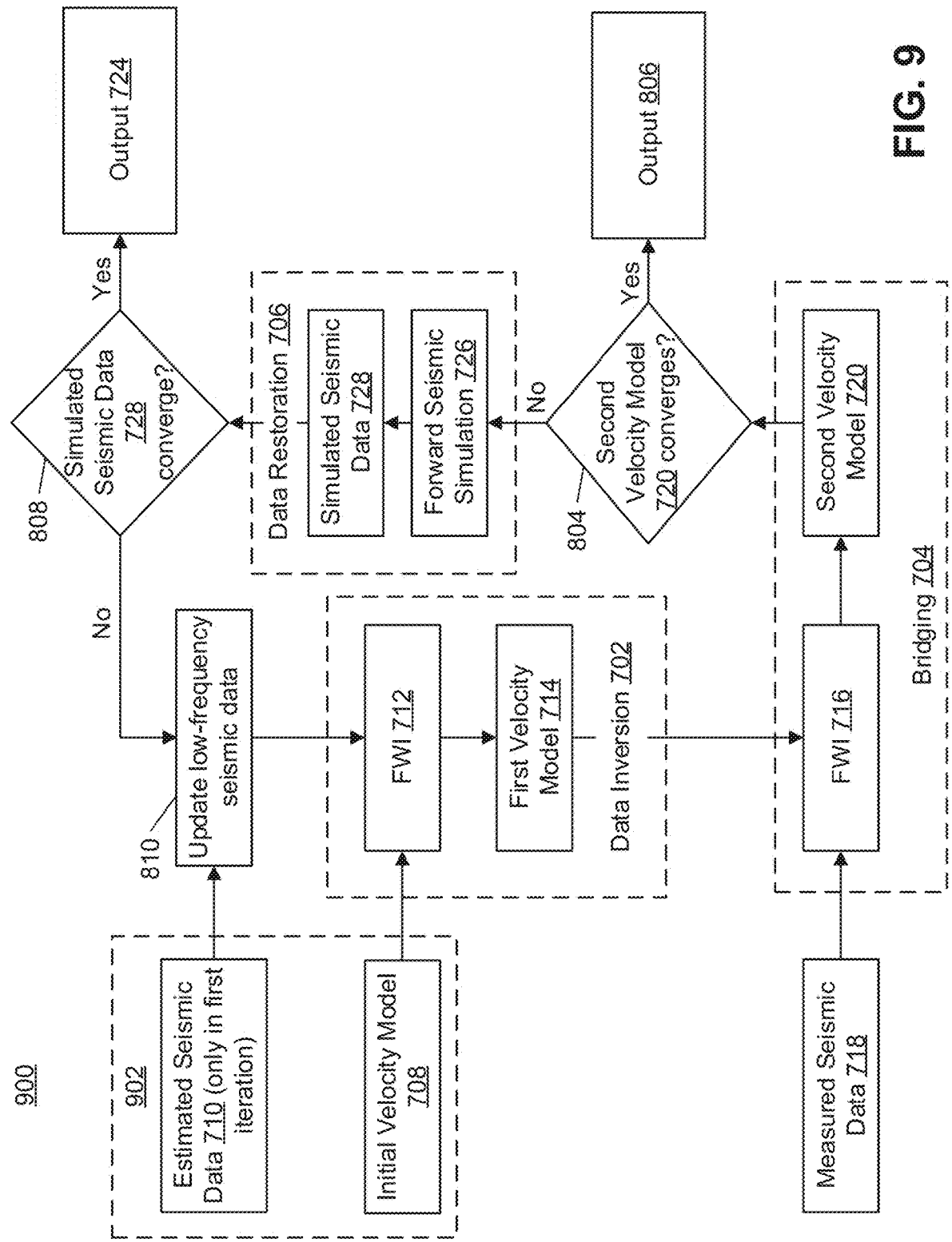
FIG. 9 is a flowchart of yet another example ARI-FWI process, consistent with some embodiments of this disclosure.

By way of example, FIG. 9 is a flowchart of yet another example ARI-FWI process 900, consistent with some embodiments of this disclosure. Process 900 share the same operation module 702 (including FWI 712 and first velocity model 714), operation module 704 (including FWI 716, second velocity model 720), operation module 706 (including forward seismic simulation 726 and simulated seismic data 728), initial velocity model 708, estimated seismic data 710, measured seismic data 718, and operation 724 with process 700 in FIG. 7, which will not be repeatedly described in detail here.

As illustrated in FIG. 9, process 900 may start at operation 902 (represented as a dash-line box enclosing initial velocity model 708 and estimated seismic data 710) in the first operation of process 900. At operation 902, initial velocity model 708 and estimated seismic data 710 may be inputted to FWI 712 to generate first velocity model 714 in operation module 702. First velocity model 714 and measured seismic data 718 may be inputted to FWI 716 to generate second velocity model 720 in operation module 704. In some embodiments, measured seismic data 718 of process 900 may be represented in one of a time domain or a frequency domain, and FWI 712 as well as FWI 716 may operate in one of the time domain or the frequency domain, similar to the above description.

At operation 804, it may be determined whether second velocity model 720 converges. If second velocity model 720 converges, process 900 may terminate at operation 806 to output second velocity model 720 for determining a subsurface feature corresponding to measured seismic data 718. In the first iteration of process 900, operation 804 may be skipped and process 900 may directly proceed to operation module 706.

If second velocity model 720 does not converge at operation 804, process 900 may proceed to operation module 706, in which second velocity model 720 may be used as input to perform forward seismic simulation 726 to generate simulated seismic data 728, which includes reconstructed low-frequency seismic data that is missing in measured seismic data 718. At operation 808, it may be determined whether the reconstructed low-frequency seismic data converges. If the reconstructed low-frequency seismic data converges, process 900 may terminate at operation 724 to output at least one of second velocity model 720 or the reconstructed low-frequency seismic data for determining the subsurface feature corresponding to measured seismic data 718.

If the reconstructed low-frequency seismic data does not converge at operation 808, process 900 may proceed to operation 810, in which the reconstructed low-frequency seismic data and initial velocity model 708 may be used as inputs, to update low-frequency seismic data. After operation 810, process 900 may proceed to operation module 702 in a new iteration, in which the updated low-frequency seismic data and initial velocity model 708 may be inputted to FWI 712, to update first velocity model 714. Process 900 can repeat the above-described iterations until terminating at either operation 724 or 806.

By way of example, with reference to FIGS. 5 and 6, the ARI-FWI process (e.g., process 700, 800, or 900 described in association with FIGS. 7-9) may use the initial velocity model as illustrated in FIG. 6 to restore a velocity model similar to the true velocity model as illustrated in FIG. 5. For example, the ARI-FWI process may be process 900, in which measured seismic data 718 may lack frequency components below 10 Hz.

In such an example, process 900 may start at operation 902, in which estimated seismic data 710 may be generated from 10 Hz and 13 Hz beat tone data to include 3 Hz components, which may be referred to as "pseudo low-frequency data." The 3 Hz pseudo low-frequency data and the initial velocity model in FIG. 6 may be inputted to FWI 712 to determine first velocity model 714.

First velocity model 714 and measured seismic data 718 may be inputted to FWI 716 to determine second velocity model 720 that has a resolution higher than first velocity model 714. For example, measured seismic data 718 may include components in a frequency range of 10-30 Hz. By performing FWI 716, some of the improper low wavenumber information introduced by the 3 Hz pseudo low-frequency data (e.g., estimated seismic data 710) may be corrected. However, at this early stage, the corrected low wavenumber information may be buried under the large amount of high wavenumber information. Such partially recovered low wavenumber information may be valuable but insufficient to suppress the cycle-skipping phenomenon and eliminate corresponding artifacts.

Figure 10:
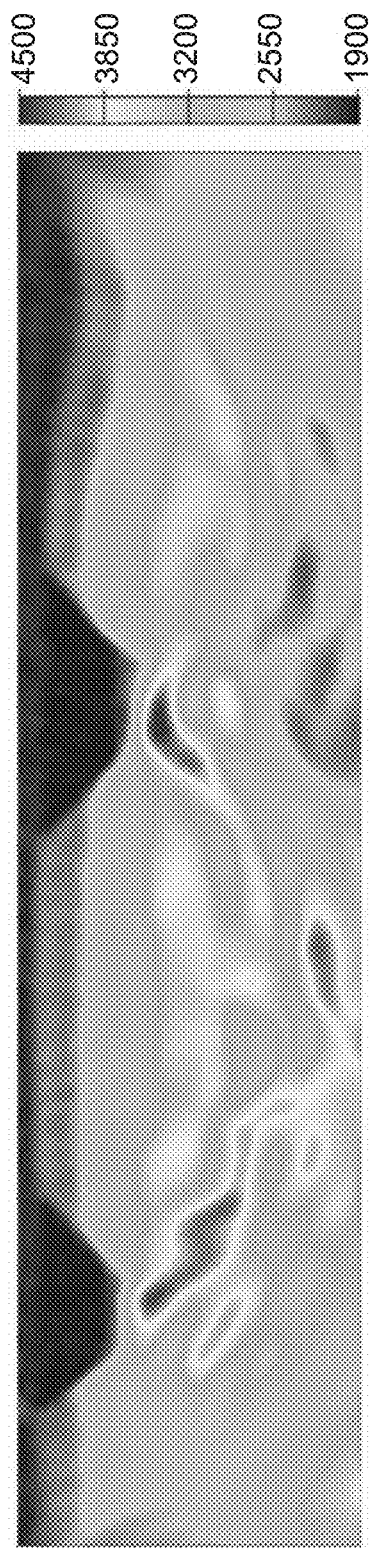
FIG. 10 is graphical representations showing a reconstructed velocity model with cycle-skipping induced artifacts, consistent with some embodiments of this disclosure.

By way of example, FIG. 10 is graphical representations showing a reconstructed velocity model with cycle-skipping induced artifacts, consistent with some embodiments of this disclosure. For example, the reconstructed velocity model in FIG. 10 may be second velocity model 720 in the first iteration of process 900 after FWI 716 that inputs measured seismic data 718 in a frequency range of 10-30 Hz and first velocity model 714 determined using the 3 Hz pseudo low-frequency data. Compared with the true velocity model in FIG. 5, the reconstructed velocity model in FIG. 10 illustrates cycle-skipping induced artifacts.

To retrieve the low wavenumber information buried in the artifact-contaminated velocity model shown in FIG. 10 and convert the retrieved low wavenumber information to the data domain, process 900 may proceed to operation module 706 in the first iteration, in which forward seismic simulation 726 may be performed to generate simulated seismic data 728 using second velocity model 720 as an input. Simulated seismic data 728 may include 3 Hz frequency components. After the first iteration, simulated seismic data 728 may be improved compared with the 3 Hz pseudo low-frequency data. It should be noted that, at operation module 706 for data restoration, any low-frequency components can be reconstructed, such as components of 3 Hz, 5 Hz, 7.5 Hz, or any frequency lower than the lower limit of measured seismic data 718.

Figure 11:
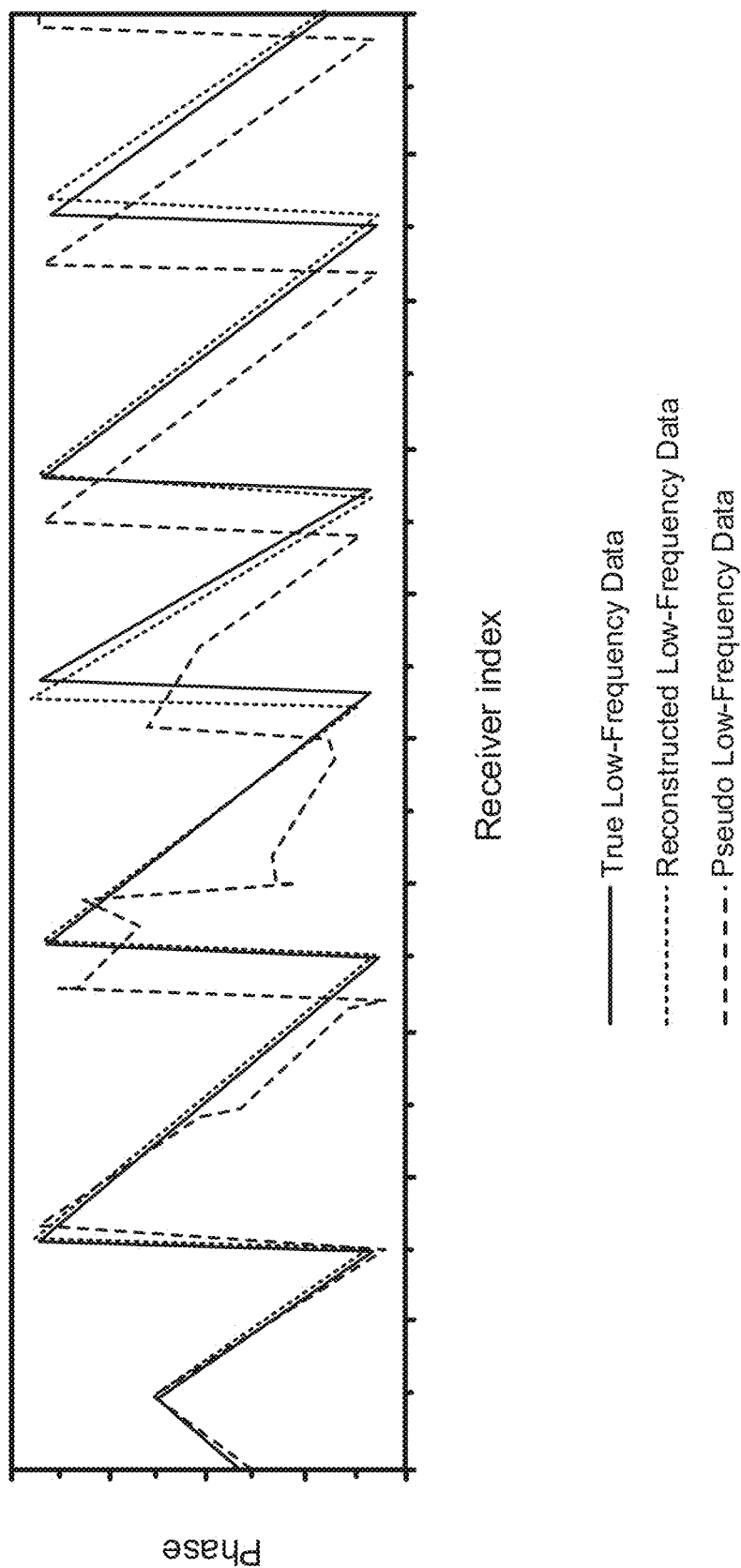
FIG. 11 is graphical representations showing comparisons of true low-frequency data, pseudo low-frequency data, and low-frequency data reconstructed after one iteration of ARI-FWI, consistent with some embodiments of this disclosure.

By way of example, FIG. 11 is graphical representations showing comparisons of true low-frequency data, pseudo low-frequency data, and low-frequency data reconstructed after one iteration of ARI-FWI, consistent with some embodiments of this disclosure. In FIG. 11, the true low-frequency data (e.g., corresponding to the true velocity model of FIG. 5) is represented as solid lines, the pseudo low-frequency data (e.g., the 3 Hz pseudo low-frequency data described above) is represented as dash lines, and the low-frequency data reconstructed after one iteration of ARI-FWI (e.g., simulated seismic data 728 after the first iteration of process 900) is represented as dotted lines. As shown in FIG. 11, the low-frequency data reconstructed after one iteration of ARI-FWI is almost identical to the true low-frequency data with slight deviation at far offsets.

Figure 12A:
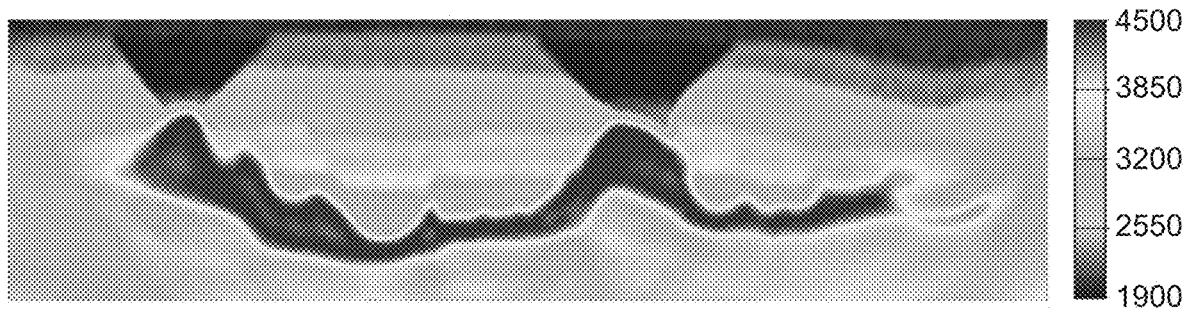
FIG. 12A is a graphical representation showing a velocity model reconstructed by conventional FWI using full-bandwidth data, consistent with some embodiments of this disclosure.
Figure 12B:
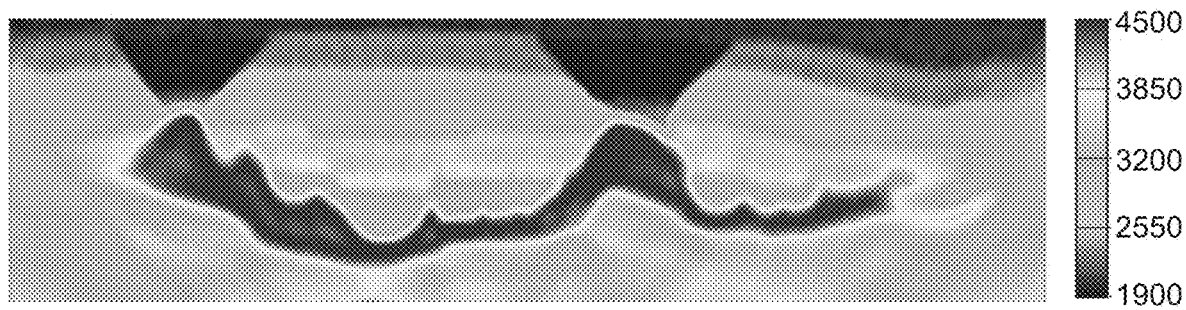
FIG. 12B is a graphical representation showing a velocity model reconstructed by three iterations of ARI-FWI using measured seismic data missing low-frequency components, consistent with some embodiments of this disclosure.
Figure 12C:
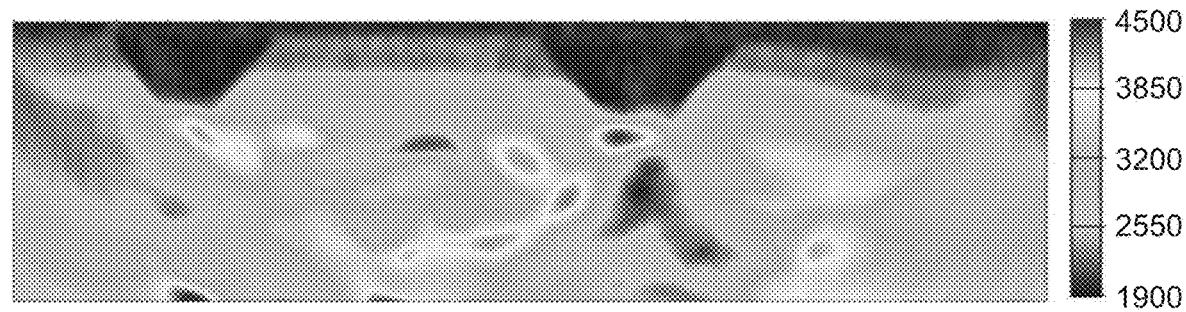
FIG. 12C is a graphical representation showing a velocity model reconstructed by conventional FWI using measured seismic data missing low-frequency components, consistent with some embodiments of this disclosure.

In an example, after three iterations of process 900, both simulated seismic data 728 and second velocity model 720 may converge. By way of example, FIG. 12A is a graphical representation showing a velocity model reconstructed by conventional FWI using full-bandwidth data (e.g., from 3 Hz to 30 Hz), consistent with some embodiments of this disclosure, FIG. 12B is a graphical representation showing a velocity model reconstructed by three iterations of ARI-FWI using measured seismic data missing low-frequency components (e.g., below 10 Hz), consistent with some embodiments of this disclosure. FIG. 12C is a graphical representation showing a velocity model reconstructed by conventional FWI using measured seismic data missing low-frequency components (e.g., including only components from 10 Hz to 30 Hz), consistent with some embodiments of this disclosure, FIG. 12A may be used as a reference to determine accuracy of the reconstructed velocity models in FIGS. 12B and 12C.

As illustrated in FIGS. 12A-12C, the velocity model reconstructed by ARI-FWI in FIG. 12B is nearly identical to the reference velocity model in FIG. 12A. By contrast, the velocity model reconstructed by conventional FWI in FIG. 12C includes severe cycle-skipping induced artifacts.

The above provided ARI-FWI process may accurately restore missing low-frequency components in measured seismic data. The velocity models reconstructed by the ARI-FWI process can suppress artifacts induced by cycle-skipping phenomenon in various geological environment (e.g., with complex salt domes).

Figure 13:
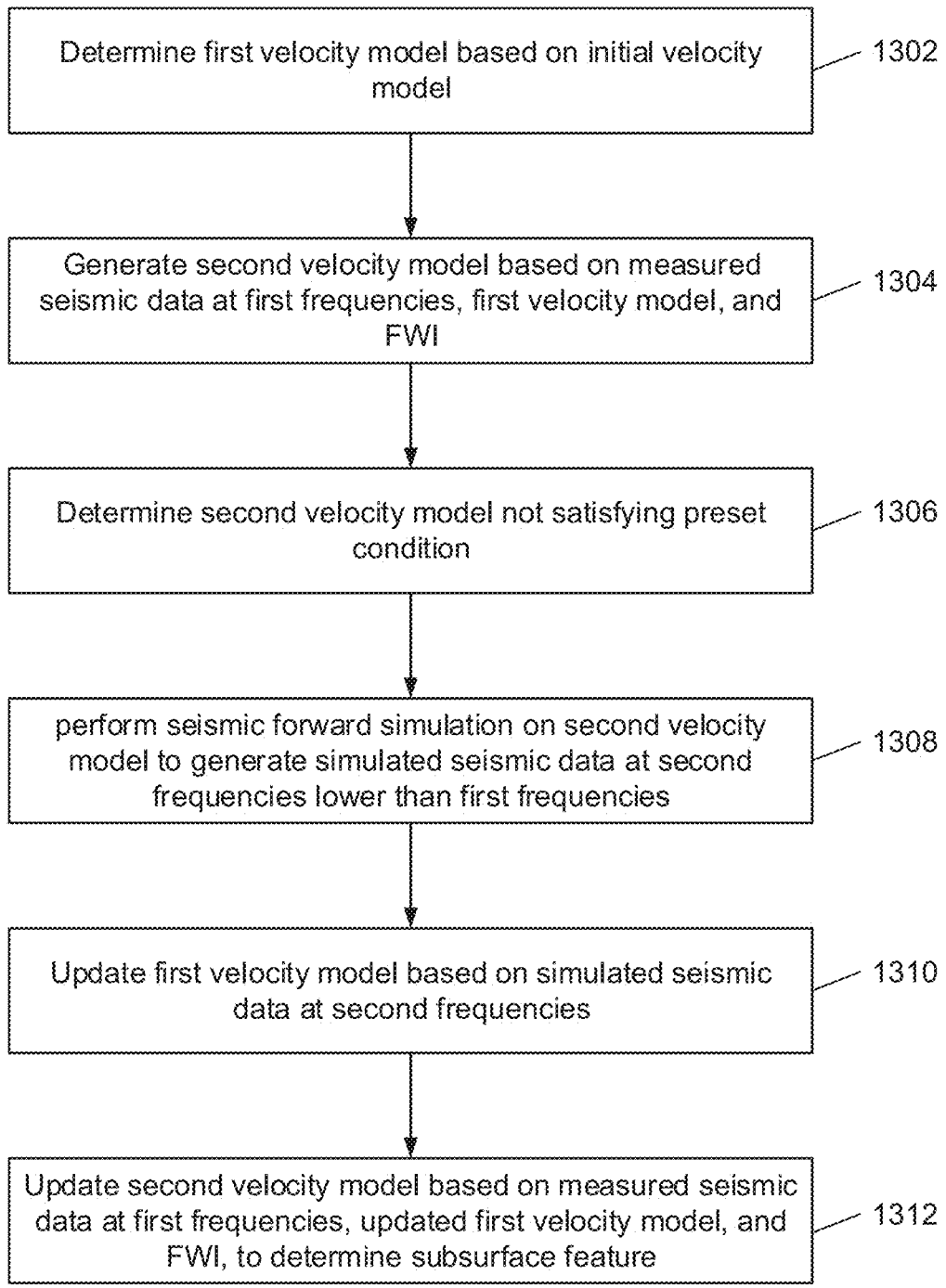
FIG. 13 is a flowchart of an example method for obtaining reconstructed low-frequency seismic data for determining a subsurface feature, consistent with some embodiments of this disclosure.

FIG. 13 is a flowchart of an example method 1300 for obtaining reconstructed low-frequency seismic data for determining a subsurface feature, consistent with some embodiments of this disclosure. Method 1300 may be performed by a computer system (e.g., system 100 of FIG. 1). The system may include a non-transitory storage medium (e.g., memory 130 of FIG. 1) to store program codes of method 1300. The program codes may be executed by a processor (e.g., processor 110 of FIG. 1) to implement the operations of method 1300.

Referring to FIG. 13, at step 1302, the processor may determine a first velocity model (e.g., first velocity model 714 described in association with FIGS. 7-9) based on an initial velocity model (e.g., initial velocity model 708 described in association with FIGS. 7-9). In some embodiments, the processor may determine the initial velocity model as the first velocity model.

In some embodiments, to determine the first velocity model, the processor may estimate seismic data (e.g., yielding estimated seismic data 710 described in association with FIGS. 7 and 9) at the one or more second frequencies lower than the one or more first frequencies. The processor may then generate the first velocity model based on the estimated seismic data, the initial velocity model, and the FWI (e.g., FWI 712 described in association with FIGS. 7-9). In some embodiments, to estimate the seismic data at the one or more second frequencies lower than the one or more first frequencies, the processor may determine beat tone data from measured seismic data (e.g., measured seismic data 718 described in association with FIGS. 7-9) at the one or more first frequencies.

At step 1304, the processor may generate a second velocity model (e.g., second velocity model 720 described in association with FIGS. 7-9) based on the measured seismic data (e.g., measured seismic data 718 described in association with FIGS. 7-9) at one or more first frequencies, the first velocity model, and a full waveform inversion (FWI) (e.g., FWI 716 described in association with FIGS. 7-9). In some embodiments, a resolution of the first velocity model may be lower than a resolution of the second velocity model. In some embodiments, the measured seismic data can be represented in one of a time domain or a frequency domain, and the FWI (e.g., FWI 712 or 716 described herein) can operate in one of the time domain or the frequency domain.

At step 1306, if it is determined that the second velocity model does not satisfy a preset condition (e.g. the condition described in operation 722 of FIG. 7 or in operation 804 of FIGS. 8-9), method 1300 may proceed to step 1308.

At step 1308, the processor may perform a seismic forward simulation (e.g., forward seismic simulation 726 described in association with FIGS. 7-9) on the second velocity model to generate simulated seismic data (e.g., simulated seismic data 728 described in association with FIGS. 7-9) at one or more second frequencies lower than the one or more first frequencies. In some embodiments, the processor ay perform the seismic forward simulation using at least one of a finite-difference time-domain (FDTD) method, a finite element method (FEM), a boundary element method, an integral equation method, a spectral element method, a pseudo spectral method, a fast multipole method, a method of lines, a finite volume method, a meshfree method, or a discontinuous Galerkin method.

At step 1310, the processor may update the first velocity model based on the simulated seismic data at the one or more second frequencies.

At step 1312, the processor may update the second velocity model based on the measured seismic data at the one or more first frequencies, the updated first velocity model, and the FWI, to determine the subsurface feature.

Consistent with some embodiments of this disclosure, besides steps 1302-1312, the processor may further output the second velocity model representing the subsurface feature in response to the second velocity model satisfying the preset condition.

Consistent with some embodiments of this disclosure, besides steps 1302-1312, the processor may further generate the initial velocity model (e.g., the initial velocity model of FIG. 6) using, e.g., a conventional velocity model building method such as a travel-time tomography technique, a stacking velocity technique, a wave equation tomography technique, a technique of velocity estimation from well log data, etc. The processor may also obtain the initial velocity model by generating the initial velocity model based on a priori knowledge of the subsurface feature.

Consistent with some embodiments of this disclosure, the preset condition at step 1306 may be a first preset condition, and the processor may further perform step 1310 in response to the simulated seismic data at the one or more second frequencies not satisfying a second preset condition (e.g., the condition described in operation 808 of FIGS. 8-9). In response to the simulated seismic data at the one or more second frequencies satisfying the second preset condition, the processor may output at least one of the simulated seismic data at the one or more second frequencies, or the second velocity model representing the subsurface feature.

In exemplary embodiments, there is also provided a non-transitory computer-readable medium having stored therein instructions. For example, the instructions may be executed by a processor of a system to cause the system to perform the above described methods. For example, the non-transitory computer-readable medium may be a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While illustrative embodiments have been described herein, the scope thereof includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented method for determining a subsurface feature, the method comprising:
    determining a first velocity model based on an initial velocity model;
    generating a second velocity model based on measured seismic data at one or more first frequencies, the first velocity model, and a full waveform inversion (FWI); and
    in response to the second velocity model not satisfying a preset condition,
        performing a seismic forward simulation on the second velocity model to generate simulated seismic data at one or more second frequencies lower than the one or more first frequencies;
        updating the first velocity model based on the simulated seismic data at the one or more second frequencies; and
        updating the second velocity model based on the measured seismic data at the one or more first frequencies, the updated first velocity model, and the FWI, to determine the subsurface feature.

2. The computer-implemented method of claim 1, further comprising:
    in response to the second velocity model satisfying the preset condition, outputting the second velocity model representing the subsurface feature.

3. The computer-implemented method of claim 1, wherein determining the first velocity model comprises:
    estimating seismic data at the one or more second frequencies lower than the one or more first frequencies; and
    generating the first velocity model based on the estimated seismic data, the initial velocity model, and the FWI.

4. The computer-implemented method of claim 3, wherein estimating the seismic data at the one or more second frequencies lower than the one or more first frequencies comprises one of:
    determining beat tone data from the measured seismic data at the one or more first frequencies; or
    using a bandwidth-extension technique to estimate the seismic data at the one or more second frequencies.

5. The computer-implemented method of claim 1, wherein determining the first velocity model comprises:
    determining the initial velocity model as the first velocity model.

6. The computer-implemented method of claim 1, further comprising obtaining the initial velocity model by at least one of:
    generating the initial velocity model using at least one of a travel-time tomography technique, a stacking velocity technique, a wave equation tomography technique, or a technique of velocity estimation from well log data; or
    generating the initial velocity model based on a priori knowledge of the subsurface feature or a seismic data processor's experience and knowledge.

7. The computer-implemented method of claim 1, wherein performing the seismic forward simulation comprises:
    performing the seismic forward simulation using at least one of a finite-difference time-domain (FDTD) method, a finite element method (FEM), a boundary element method, an integral equation method, a spectral element method, a pseudo spectral method, a fast multipole method, a method of lines, a finite volume method, a meshfree method, or a discontinuous Galerkin method.

8. The computer-implemented method of claim 1, wherein the preset condition is a first preset condition, and the method further comprises:
    in response to the simulated seismic data at the one or more second frequencies not satisfying a second preset condition, performing the updating the first velocity model based on the simulated seismic data at the one or more second frequencies; and
    in response to the simulated seismic data at the one or more second frequencies satisfying the second preset condition, outputting at least one of the simulated seismic data at the one or more second frequencies, or the second velocity model representing the subsurface feature.

9. The computer-implemented method of claim 1, wherein a resolution of the first velocity model is lower than a resolution of the second velocity model.

10. The computer-implemented method of claim 1, wherein the measured seismic data is represented in one of a time domain or a frequency domain, and the FWI operates in one of the time domain or the frequency domain.

11. A system, comprising:
    a processor; and
    a memory storing instructions executable by the processor,
    wherein the processor is configured to:
    determine a first velocity model based on an initial velocity model;
    generate a second velocity model based on measured seismic data at one or more first frequencies, the first velocity model, and a full waveform inversion (FWI); and
    in response to the second velocity model not satisfying a preset condition,
        perform a seismic forward simulation on the second velocity model to generate simulated seismic data at one or more second frequencies lower than the one or more first frequencies;
        update the first velocity model based on the simulated seismic data at the one or more second frequencies; and
        update the second velocity model based on the measured seismic data at the one or more first frequencies, the updated first velocity model, and the FWI, to determine a subsurface feature.

12. The system of claim 11, wherein the processor is further configured to:
   in response to the second velocity model satisfying the preset condition, output the second velocity model representing the subsurface feature.

13. The system of claim 11, wherein in determining the first velocity model, the processor is further configured to:
   estimate seismic data at the one or more second frequencies lower than the one or more first frequencies; and
   generate the first velocity model based on the estimated seismic data, the initial velocity model, and the FWI.

14. The system of claim 13, wherein in estimating the seismic data at the one or more second frequencies lower than the one or more first frequencies, the processor is further configured to:
   determine beat one data from the measured seismic data at the one or more first frequencies; or
   use a bandwidth-extension technique to estimate the seismic data at the one or more second frequencies.

15. The system of claim 11, wherein in determining the first velocity model, the processor is further configured to:
   determine the initial velocity model as the first velocity model.

16. The system of claim 11, wherein the processor is further configured to obtain the initial velocity model by at least one of:
   generating the initial velocity model using at least one of a travel-time tomography technique, a stacking velocity technique, a wave equation tomography technique, or a technique of velocity estimation from well log data; or
   generating the initial velocity model based on a priori knowledge of the subsurface feature or a seismic data processor's experience and knowledge.

17. The system of claim 11, wherein the preset condition is a first preset condition, and the processor is further configured to:
   in response to the simulated seismic data at the one or more second frequencies not satisfying a second preset condition, perform the updating the first velocity mod& based on the simulated seismic data at the one or more second frequencies; and
   in response to the simulated seismic data at the one or more second frequencies satisfying the second preset condition, output at least one of the simulated seismic data at the one or more second frequencies, or the second velocity model representing the subsurface feature.

18. The system of claim 11, wherein a resolution of the first velocity model is lower than a resolution of the second velocity model.

19. The system of claim 11, wherein the measured seismic data is represented in one of a time domain or a frequency domain, and the FWI operates in one of the time domain or the frequency domain.

20. A non-transitory computer-readable storage medium having stored therein instructions that, when executed by a processor of a device, cause the device to perform operations comprising:
   determining a first velocity model based on an initial velocity model;
   generating a second velocity model based on measured seismic data at one or more first frequencies, the first velocity model, and a full waveform inversion (FWI); and
   in response to the second velocity model not satisfying a preset condition,
      performing a seismic forward simulation on the second velocity model to generate simulated seismic data at one or ore second frequencies lower than the one or more first frequencies;
      updating the first velocity model based on the simulated seismic data at the one or more second frequencies; and
      updating the second velocity model based on the measured seismic data at the one or more first frequencies, the updated first velocity model, and the FWI, to determine the subsurface feature.

* * * * *